United States Patent [19]
Dietrich et al.

[11] Patent Number: 5,216,593
[45] Date of Patent: Jun. 1, 1993

[54] METHOD AND APPARATUS FOR DISCRETE ACTIVITY RESOURSE ALLOCATION THROUGH CARDINALITY CONSTRAINT GENERATION

[75] Inventors: Brenda L. Dietrich, Yorktown Heights, N.Y.; Laureano F. Escudero, Madrid, Spain

[73] Assignee: International Business Machines Corporation, Armonk, N.Y.

[21] Appl. No.: 645,385

[22] Filed: Jan. 24, 1991

[51] Int. Cl.[5] .................. G06F 15/22; G06F 15/46
[52] U.S. Cl. .................................. 364/402; 364/401; 364/156; 364/468
[58] Field of Search ............ 364/401, 402, 403, 468, 364/156

[56] References Cited

U.S. PATENT DOCUMENTS

| | | | |
|---|---|---|---|
| 4,459,663 | 7/1984 | Dye | 364/403 |
| 4,821,197 | 4/1989 | Kenik et al. | 364/468 |
| 4,827,423 | 5/1989 | Beasley et al. | 364/468 |
| 4,887,208 | 12/1989 | Schneider et al. | 364/403 |
| 5,089,970 | 2/1992 | Lee et al. | 364/468 |
| 5,101,352 | 3/1992 | Rembert | 364/403 |
| 5,119,307 | 6/1992 | Blaha et al. | 364/468 |

*Primary Examiner*—Roy N. Envall, Jr.
*Assistant Examiner*—Jennifer L. Hazard
*Attorney, Agent, or Firm*—Whitam & Marhoefer

[57] ABSTRACT

The required computational effort in the areas of production planning and logistics, scheduling, distribution and resource allocation is reduced by a procedure for solving a Discrete Activity Resource Allocation (DARA) problem. The procedure begins by reducing all activities and resources which do not contribute to maximizing benefit. Thus, all infeasible and non-profitable activities are discarded and all non-constraining resources are discarded, thereby considerably simplifying the solution to the problem. Next, an automatic mathematical model formulation of the DARA problem is performed. Based on this model, a list of cliques and covers are generated. The linear relaxation of the DARA problem using standard linear programming software is solved, and the generated list of clique and cover induced inequalities is scanned to select a set violated by the solution of the linear relaxation of the DARA problem. For those inequalities found, constraints are appended to the formulated DARA problem, forming another DARA problem with the same set of variables, but with additional constraints. The new DARA problem is then solved using the previous solution as the start of the solution. Based on this solution, the generated list of clique and cover induced inequalities is again scanned, and this process is continued until no violated inequalities are found. At this point in the procedure, conventional branch-and-bound or branch-and-cut routines are used to solve the enlarged DARA problem. The solution yields the optimal resource allocation producing the maximum benefit.

10 Claims, 6 Drawing Sheets

METHOD AND APPARATUS FOR DISCRETE ACTIVITY RESOURSE ALLOCATION THROUGH CARDINALITY CONSTRAINT GENERATION

BACKGROUND OF THE INVENTION

1. Field of the Invention

The present invention generally relates to resource allocation of discrete activities by data processing systems and, more particularly, to techniques for determining and applying an irredundant set of cardinality constraints enabling both interactive decision support systems and more efficient solution of related discrete optimization problems. The resource allocation may be, for example, capital, inventory, manpower, raw material, machine time, tools, and the like.

2. Description of the Prior Art

Project Management, as a modern management tool, has its origins in the early part of this century when Henry L. Gantt, while working for the government during World War I, developed his now famous visual aid for work control. The Gantt chart is a graphic representation of a project schedule that shows each task as a bar having a length proportional to the duration of the task. Later during the 1950s, Dr. John Presper Mauchley, a coinventor of the EDVAC at the University of Pennsylvania, developed the Critical Path Method (CPM) which was further developed by Willard Frazer, a consultant on the Polaris submarine project. Frazer's contribution was called Program Evaluation and Review Technique (PERT). A PERT chart is one that resembles a flow chart showing predecessor and successor tasks of a project and the critical path.

In an increasingly competitive world market, the problem of allocating available resources to, for example, manufacturing activities so as to minimize the cost of production and maximize profits is one that is the focus of considerable attention. The problem does not admit of simple solutions since there are typically many variables and often many potential solutions, a number of which may appear a priori to be equally viable. Project management techniques, however, assume that decisions have been made regarding resource allocation. For those industries where there is surplus capacity, the decisions involved in resource allocation are relatively easy, but surplus capacity is a rare commodity in today's market driven economies.

A more recent development is Materials Requirements Planning (MRP) which is a system for translating demand for final products into raw material requirements. Many authors have published papers and books in the field of production management. For example, Joseph Orlicky wrote *Material Requirements Planning*, published by McGraw-Hill, which has become an industry standard reference for planning requirements. MRP is essentially an information system (bill of material database, inventory database) and a simulation tool that generates proposals for production schedules which managers can evaluate in terms of their feasibility and cost effectiveness. MRP does not deal with optimization issues or with constrained resources or with discrete activities (e.g., large item production orders). An example of an MRP system is IBM's computer program product COPICS, which is currently in use in many manufacturing facilities.

MRP is an excellent planning tool. A manufacturing manager can plan purchases and production to meet forecasted final demands. However, MRP is not particularly useful for making decisions regarding the execution of the actual manufacturing process. This is particularly true when demand forecasts are inexact and raw material lead time is long. In these circumstances, the manufacturing manager or production controller is often faced with raw material inventory that is inadequate to meet all of planned or committed short-term demand. Decision support tools are needed to aid the manager in determining and evaluating possible production plans. If the demand corresponds to specific customer orders, and partial orders are of no value to the customer, as in the case of aircraft, heavy machinery, large mainframe computers, and the like, then determining producing plans is equivalent to selecting a set of orders to complete.

Generalizing, the twin goals of minimizing cost and maximizing profits may be characterized as maximizing benefit. Since no benefit is obtained unless an activity is completed, there is no advantage to allocating resources to activities which are only partially completed. Thus, an activity is either to be completed, or it is not to be allocated any resource. This is equivalent to selecting a set of activities to undertake, providing that there is sufficient resource to complete all the undertaken activities, and among all such sets, selecting the set that has the greatest total benefit. Since each activity is either to be completed, or not undertaken, the decision variables associated with their activities are discrete; that is, each takes either the value 0 (meaning activity is not undertaken) or the value 1 (meaning that the activity is completed). The optimization problem to be solved is one of discrete activity resource allocation (DARA).

The discrete activity resource allocation problem has many important applications, particularly, but not exclusively, in manufacturing planning and management. Some representative applications include the following:
1. Product families allocation to worldwide plants.
2. Sourcing decisions on long-term production planning.
3. Inter-plant aggregate production planning.
4. Vendor production allocation to final products.
5. Components allocation to final products in a multi-product, multi-period, single-level environment.
6. Components allocation to subassemblies and final products in a multi-product, multi-period, multi-level environment.
7. Capacity expansion planning.
8. Workload allocation to machines, tools, operators on a short-term environment.
9. Operation execution sequencing.
10. Material flow allocation.
11. Parts input sequencing and scheduling on a manufacturing floor.
12. Parts routing planning.
13. Operation execution scheduling.
14. Parts transportation scheduling.

The resources can be so diverse as in-house producing units (i.e., plants), selected sets of outside sources (i.e., third parties or vendors), information devices and raw materials inventory as well as (physical) manufacturing resources such as machine time available, manpower hours, tools, robots, ovens, testers, warehouse, energy, transportation units and raw materials. The activities can be production to be allocated to different plants, geographical sectors or countries, in total or per period, on the planning horizon as well as on subassemblies to be produced at given periods, jobs or orders that are to be released to the manufacturing floor at given shifts, and so on.

There is another activity that consists of the existence of the allocation of a given resource to a given activity. Examples of what is called the do event are as follows:

- A vendor is chosen for the supply of a given raw material.
- A plant, department, shift, process is chosen for the production of a given subassembly or final product.
- A product is assigned to a given machine at a given period.
- A change of jobs or part types assembly is scheduled in a given machine at a given period and, then, some setup is required.
- A given Bill of Materials is chosen for the assembly of a product at a given period.

Because of the importance of the problem of discrete activity resource allocation, efforts have been made to characterize the problem mathematically so as to better analyze the problem and arrive at a solution. For example, the DARA problem may be mathematically characterized as follows. Let I be a set of resource and for each $i \in I$, let $b_i$ denote the available quantity of resource i. Let J be a set of activities and for each $j \in J$, let $c_j$ denote the benefit obtained from completion of activity j. No benefit is received for incomplete activities. It is assumed that each activity, if it is to be undertaken, will be completed and will consume some available resource(s). It is also assumed that the quantity of resource required by an activity is completely determined by the resource and the activity and is not influenced by the combination of activities undertaken. For each resource-activity pair i,j, with $i \in I$ and $j \in J$, the quantity $a_{ij} \geq 0$ is defined as the quantity of resource i required to complete activity j. It is assumed that activities do not produce resources, other than the associated benefit. That is, $a_{ij} \geq 0$ for all $i \in I$ and $j \in J$.

Let the decision regarding activity i be denoted by the variable $\delta_i$, where $\delta_i = 1$ means that the activity i is completed and $\delta_i = 0$ means that the activity i is not undertaken. Then the discrete activity resource allocation problem can be written as a 0-1 integer program (IP)

$$z = \text{MAX } c\delta \quad (1.1)$$
$$\text{such that } A\delta \leq b$$
$$\delta_i \in \{0,1\} \text{ for all } i \in I$$

where $\delta$ is a column vector of the 0-1 variables, c is the benefit vector, A is the coefficient matrix of the constraint (representing resource requirements by the activities), and b is the vector of resource availabilities. All vectors and the matrix are assumed to have the appropriate dimensions.

The most common method for solving the mixed 0-1 program (1.1) above consists of relaxing the integrality requirement of the vector $\delta$, replacing it with the bounding constraint $0 \leq \delta \leq 1$, solving the associated linear program (LP) and then using a branch-and-bound methodology to obtain a solution that satisfies the integrality constraint. This is described, for example, by K. Hoffman and M. Padberg, "LP-based combinatorial problem solving", *Annals of Operations Research* 4 (1985), pp. 145-194, and by G. L. Nemhauser and L. A. Wolsey, *Integer and Combinatorial Optimization*, J. Wiley, N.Y. (1988). The branch-and-bound phase of such a procedure can require examination of an exponential number of nodes, and examining each node typically requires solving a LP that starts from a dual feasible, primal near-feasible solution.

Pre-processing techniques that fix some of the binary variables to their optimal values before solving the LP can reduce the number of nodes requiring examination. See, for example, M. Guignard and K. Spielberg, "Logical Reduction Methods in Zero-One Programming (Minimal Preferred Variables)", *Operations Research* 29 (1981), pp. 49-74, and U. H. Suhl, "Solving large-scale mixed-integer programs with fixed charge variables", *Mathematical Programming* 32 (1985), pp. 165-182. Reformulating the problem (1.1), so that the same vectors having integer $\delta$ are feasible but the optimal LP value is increased, can also significantly reduce the number of subproblems to be solved. Some techniques for problem reformulation can be found in Crowder, E. L. Johnson and M. Padberg, "Solving large-scale zero-one linear programming problems", *Operations Research* 31 (1983), pp. 803-834, T. Van Roy and L. A. Wolsey, "Solving mixed integer programming problems using automatic reformulation", *Operations Research* 35 (1987), pp. 45-57, and H. P. Williams, *Model Building in Mathematical Programming*, J. Wiley N.Y. (1978), as well as the article by M. Guignard et al. and the text book by G. L. Nemhauser et al. cited above, and research in this area continues, mainly, in the direction of reformulating the subproblems encountered in the branch-and-bound procedure. The LP relaxation of the problem (1.1) can be strengthened by adding additional linear constraints (called cutting planes) that eliminate only vectors satisfying the problem (1.1) but having non-integer $\delta$. See, for example, V. Chvatal, "Edmonds polytopes and a hierarchy of combinatorial problems", *Discrete Mathematics* 4 (1973), pp. 305-357, and R. E. Gomory, "Outline an algorithm for integer solutions to linear programs", *Bulletin of the American Mathematical Society* 64 (1958), pp. 275-278. An overall framework for this type of methodology is described in the article by M. Guignard et al. above. See also the article by H. Crowder et al. cited above and L. F. Escudero, "S3 sets. An extension of the Beale-Tomlin special ordered sets", *Mathematical Programming* 42 (1988), pp. 113-123.

SUMMARY OF THE INVENTION

It is therefore an object of the present invention to provide a method and apparatus which reduces the required computational effort in the areas of production planning and logistics, scheduling, distribution and resource allocation.

It is another object of the invention to provide a tool to collect and assess inventory and order data, generate and evaluate a production plan, and control the execution of the plan.

According to the invention, there is provided a computer implemented procedure for solving a Discrete Activity Resource Allocation (DARA) problem. Briefly stated, the procedure begins by reducing all activities and resources which do not contribute to maximizing benefit. Thus, all infeasible and non-profitable activities are discarded and all non-constraining resources are discarded, thereby considerably simplifying the solution to the problem. Next, an automatic mathematical model formulation of the DARA problem is performed. Based on this model, a list of "cliques and covers" are generated.

The constraints generated ("cliques and covers") can best be understood by way of example. Consider, for example, the resource availability constraint $10\delta_1 + 21\delta_2 + 18\delta_3 + 15\delta_4 + 17\delta_5 + 26\delta_6 \leq 43$. The corresponding cardinality constraints would be:

$\delta_2 \delta_1 + \delta_6 \leq 1$—which means choose at most one of the activities 2 and 6;

$\delta_3 + \delta_6 \leq 1$—which means choose at most one of the activities 3 and 6;

$\delta_2 + \delta_3 + \delta_4 + \delta_5 + \delta_6 \leq 2$—which means choose at most two of the activities 2, 3, 4, 5, and 6.

Each cardinality constraint provides information about a subset of the activity decision variables. Specifically, a constraint defines the number of activities represented by variables in the set that can be simultaneously selected. These cardinality constraints more clearly illustrate what the possible choices are. Constraints of this form can guide the user in selecting possible combinations of activities. They can also make the underlying mathematical optimization problem easier to solve, by guiding the search through the possible solutions, and by permitting easier evaluation of candidate solutions.

Once the list of cliques and covers are generated, the linear relaxation of the DARA problem using standard linear programming software is solved, and the generated list of clique and cover induced inequalities is scanned to select a set violated by the solution of the linear relaxation of the DARA problem. For those inequalities found, the user receives easily interpreted information upon which intelligent decisions can be based. The decisions are used to update the data, and the procedure is repeated. More specifically, constraints are appended to the formulated DARA problem, forming another DARA problem with the same set of variables, but with additional constraints. The new DARA problem is then solved using the previous solution as the start of the solution. Based on this solution, the generated list of clique and cover induced inequalities is again scanned, and this process is continued until no violated inequalities are found. At this point in the procedure, if there are any remaining decisions to be made, conventional branch-and-bound or branch-and-cut routines are used to solve the enlarged DARA problem. The solution yields the optimal resource allocation producing the maximum benefit.

The invention described below has specific application to the manufacture of mainframe computers, such as the IBM model 3090 (a trademark of International Business Machines Corp.) mainframe computer, and minicomputers, such as the IBM AS400 (a registered trademark of International Business Machines Corp.) minicomputer, both of which are highly customized since no two customers place identical orders. The invention could also be applied to drive the production release procedure for microcomputers, such as the IBM PS/2 (a registered trademark of International Business Machines Corp.) microcomputer, were it desirable to offer customers a wide range of models and options.

In the case of mainframe computer and minicomputer manufacturing plants, there is a great variability in the product demand and a wide range of models, options and peripherals. As a result, production planers are often faced with mismatches between their current set of orders and their on-hand inventory. They must therefore determine the best way of allocating their available inventory. Currently, an elaborate priority system is used, this can lead to very bad allocation schemes; e.g., one order with high priority consuming so much of a scarce commodity that nothing else can be built. The invention selects orders and provides input to a floor control system (which creates shop orders and releases inventory to the shop) and provides a better allocation of inventory, resulting in the production of a more profitable set of orders.

The application of the invention to the production of computers is merely illustrative, and those skilled in the art will recognize that the invention can be advantageously applied to the manufacture of any large, indivisible, or highly customized product. The key to applicability is that the manager is provided with the tools to decide which items to make, rather than how many of each of a set of standard items to make.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
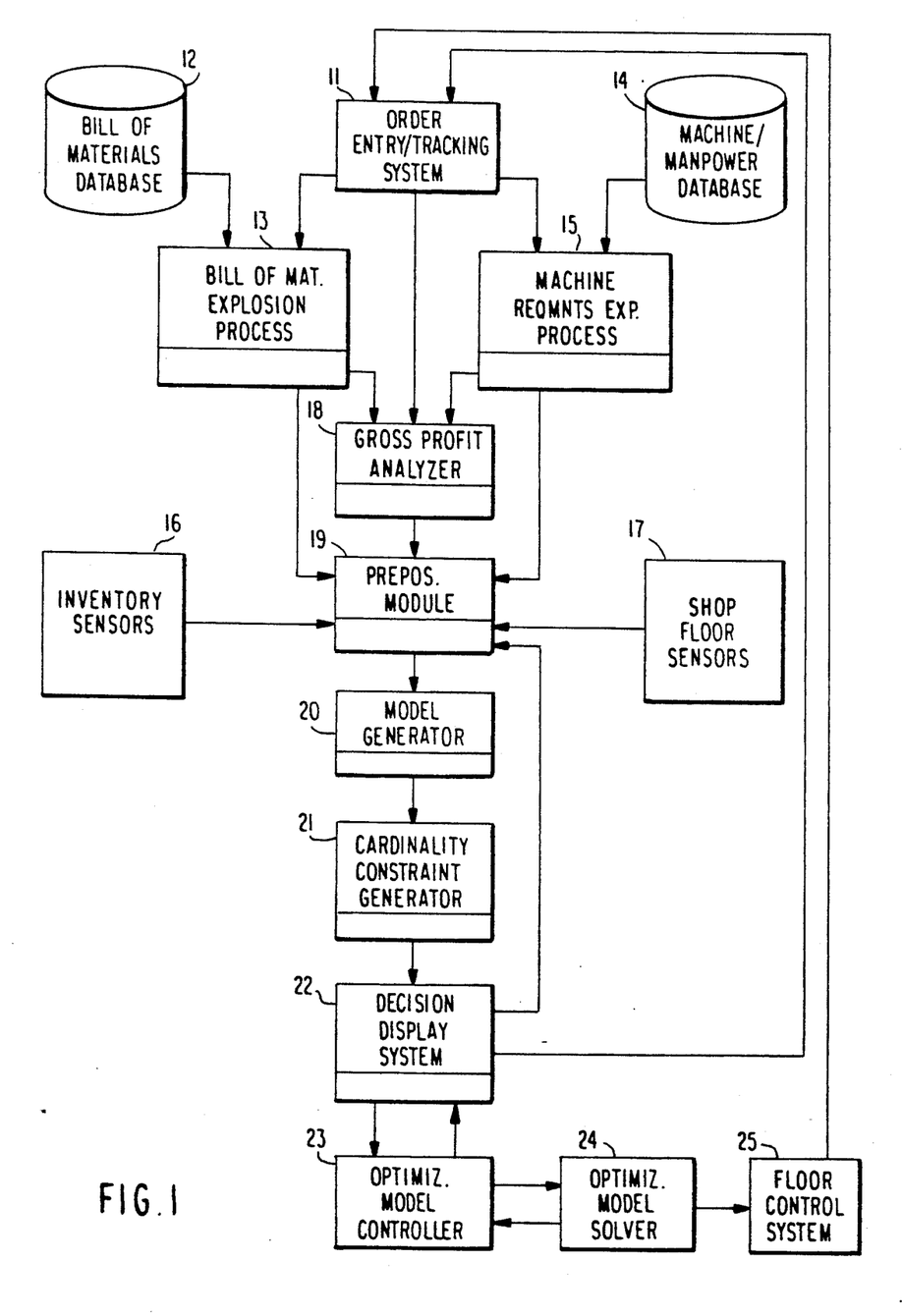
FIG. 1 is a functional block diagram showing the computer implementation of the system according to the invention.

Referring now to the drawings, and more particularly to FIG. 1, there is shown in functional block diagram form a computer system on which the procedure according to the invention is implemented. In the preferred embodiment, the invention is implemented on an IBM model 3090 mainframe computer. The computer system includes an order entry/tracking system 11 which collects customer orders and maintains a list of all outstanding orders. The order entry/tracking system consists of a database and facilities for extracting and updating the data. IBM DATABASE 2 (DB2) (DATABASE 2 and DB2 are trademarks of International Business Machines Corp.) database program product can be used. For each order, the database includes information such as customer, order placement date, desired shipment date, order specifications (e.g., the specific model, options, and peripherals selected by the customer), customer price, and order status (e.g., shipped, complete, released to shop, pending, postponed, rejected). Sales managers enter data from sales contracts, the shop control system (described below) modifies the status data, and the sales manager changes other data as required, as described in more detail below.

A bill of materials database 12 is stored on a direct access storage device (DASD) such as, for example, a diskpack. This database is accessed by a bill of material explosion process 13 which transforms customer orders from the order entry/tracking system 11 into raw material requirements. The bill of materials explosion process can be performed by any MRP system. A specific example is the IBM program product COPICS (trademark of International Business Machines Corp.).

Another database, this one a machine/manpower database 14, also stored on DASD, is accessed by a machine requirements explosion process 15 which determines the machine and manpower requirements of each order from the order entry/tracking system 11. The machine requirements explosion is simpler than the bill of materials explosion process and, therefore, may be easily performed by running simple queries against the ordered database and the machine requirements database. The database is assumed to contain the time requirements (e.g., in hours) for producing each model, option, and peripheral, on each piece of equipment in the shop, and by each category of skilled workers. From this data, and the order specifications in the order database, the total requirements for each resource by each order is easily computable.

In addition to stored database input and customer order input, the computer system receives input from various sensors. The first of these are inventory sensors 16 which input the available quantity of each raw material. These sensors may include, for example, bar code readers and an inventory database in an automated material storage and retrieval system. Sensors detect which locations of the material storage system are occupied and the bar code readers determine the contents of each location as well as the numbers and types of components removed from each location. In a less sophisticated system, or as part of the material storage system, the inventory sensors may be weighing scales used to weigh bins of small items to estimate availability.

In addition, the shop floor is provided with sensors 17 which determine the availability of machines and manpower. The shop floor sensors may include, for example, employee badge readers that record arrival and departure of employees and various equipment sensors that determine whether a machine is in use, idle, broken, or being repaired. While equipment sensors tend to be machine specific, such sensors are generally available in computer controlled machines systems where sensors are used to provide data to the controlling computer regarding the status of the machine being controlled.

A gross profit analyzer 18 receives as inputs the outputs of the order entry/tracking system 11, the bill of material explosion process, and the machine requirements explosion process and determines the profit associated with each order. A straight forward implementation of a profit analyzer is an application program that computes the cost of manufacturing the order (cost of required inventory +cost of manpower and machine usage) from the inventory and machine requirements for each order and subtracts from this cost the price to be charged the customer.

The output of the gross profit analyzer 18 and the inventory and shop floor sensors 16 and 17 are supplied to a data preprocessing module 19. This module collects the data, updates the data as orders are selected or rejected and performs preprocessing on the data. This preprocessing includes the elimination from consideration of orders that cannot be produced (e.g., insufficient inventory or machine availability) and the elimination from consideration of resources that will not effect order selection, exactly in steps 30 and 32 of FIG. 2.

The preprocessed data is supplied to a model generator 20 that mathematically models the consumption of each resource by orders and the availability of resources. The model generator is usually problem specific and written by a practioner skilled in the art of computer programming. A specific model generator has been implemented in the programming languages Pl/I and C; however, other programming languages may be used. The model generator consists of a set of routines to read or receive the data into appropriate data structures.

The results of this modeling are supplied to a cardinality constraint generator 21 which determines simple choices implied by the mathematical model. Constraints from the constraint generator are displayed to the user. Relevant data from the databases 12 and 14 are also displayed. The choices are presented to the user via an interactive decision display system that displays and explains the choices implied by the mathematical model. With this information, the user may select or reject orders, and this user input is collected and incorporated in the mathematical model as well as used as an input to the shop control system. Thus, as shown in FIG. 1, user decisions are fed back to the order entry/tracking system 11 and the data preprocessing model 19.

The interactive decision display system 22 through which the user enters selections is an interactive system in which user prompts and selections are displayed on a suitable display system, such as a cathode ray tube (CRT) display (not shown). The decision display system 22 provides a display of simple decision choices to the user, and the user interacts with the system by providing the appropriate input through an entry system which may include a keyboard, cursor control device, or the like, all of which are conventional and are, therefore, not shown. A preferred decision display system 22 incorporates the IBM model 3270 display, a database dialogue system such as the IBM REXX (a trademark of International Business Machines Corp.) system, and the databases 12 and 14, described above.

Each clique constraint $$\sum_{i \in C} \delta_i \leq 1$$

can be interpreted as, "At most one of the activities in set C can be completed". Each cover constraint $$\sum_{i \in C} \delta_i \leq k_c$$

can be interpreted as, "At most $k_c$ of the activities in the set C can be completed"; the remaining cannot, and at least $|C| - k_c$ should not be attempted. The user (or system) is then given the data necessary to select one (or none) of the activities. That data includes (1) a list of activities in the set C, (2) the benefit associated with each activity, (3) an estimate of a realized benefit associated with the activity (including the opportunity lost by prohibiting other activities in the set C), and (4) the remaining resources available should an activity be selected and the potential impact on activities not in the set C. The user may either (1) select an activity to be completed, thus prompting the system to begin that activity, (2) reject an activity, (3) make no decision but instead request an alternate set of options, or (4) make no decision and request that the optimization model controller solve the DARA problem and provide a new solution for review.

An optimization model controller 23 updates the mathematical model based on the user's input and provides information to the interactive decision display system. The optimization model controller performs this function using an optimization model solver 24 that contains as a subroutine the cardinality constraint generator. A preferred optimization model solver is the IBM program product MPSX v.2. A floor control system 25 receives output from the optimization model solver 24 and creates work orders and releases the required inventory to the shop floor for selected orders. The work order and inventory data are fed back to the order entry/tracking system 11.

Alternatively, the user may use the system as a planning tool. For example, the user may tentatively select an activity and use the system to further explore implications of that selection. Based on information developed by the system for the user, the user may choose to make no decision but instead request an alternate set of selections, or the user may request that the optimization model controller 23 solve the DARA problem and provide the solution for review by the user.

Figure 2:
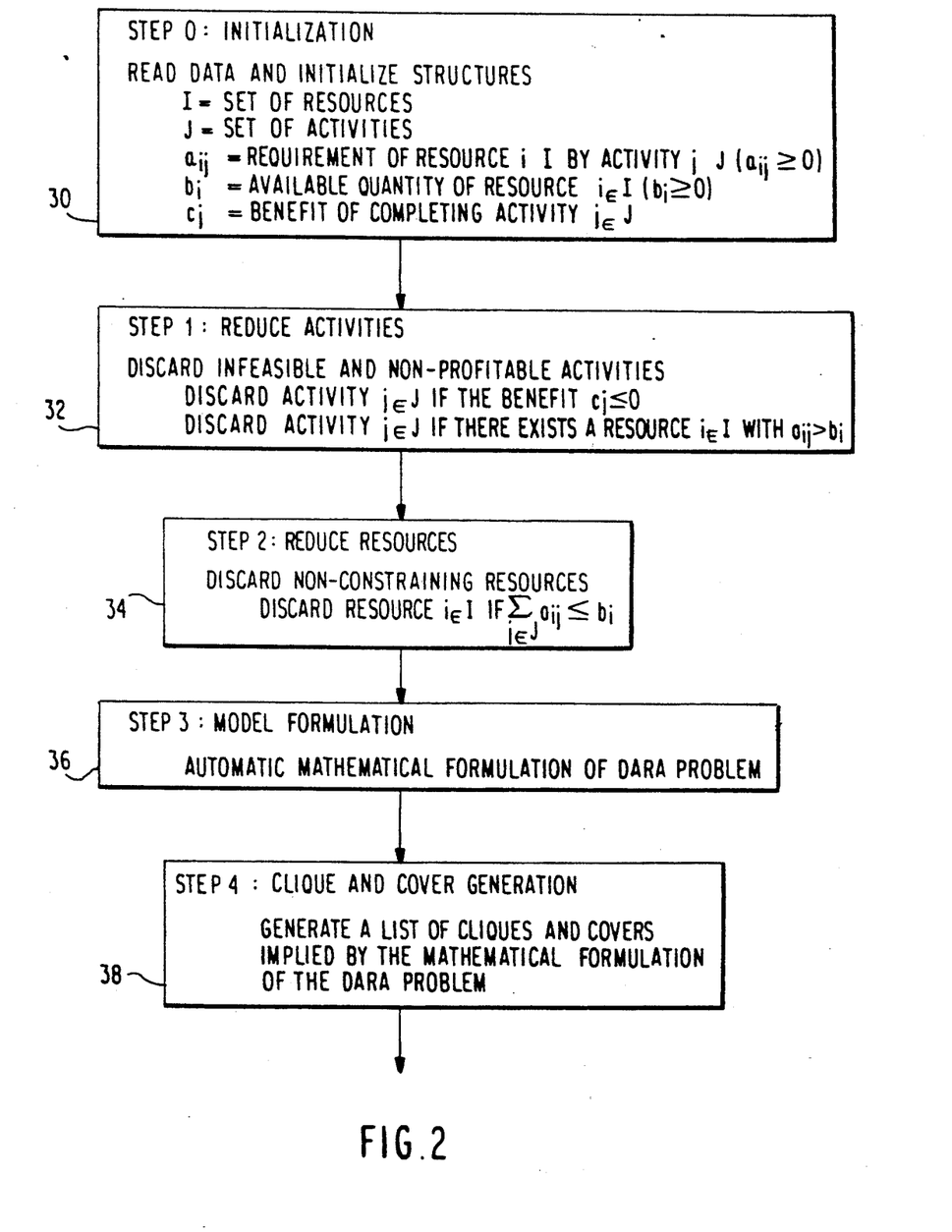
FIGS. 2 and 3, taken together, are a flowchart showing the procedure for solving a Discrete Activity Resource Allocation (DARA) problem according to the invention.
Figure 3:
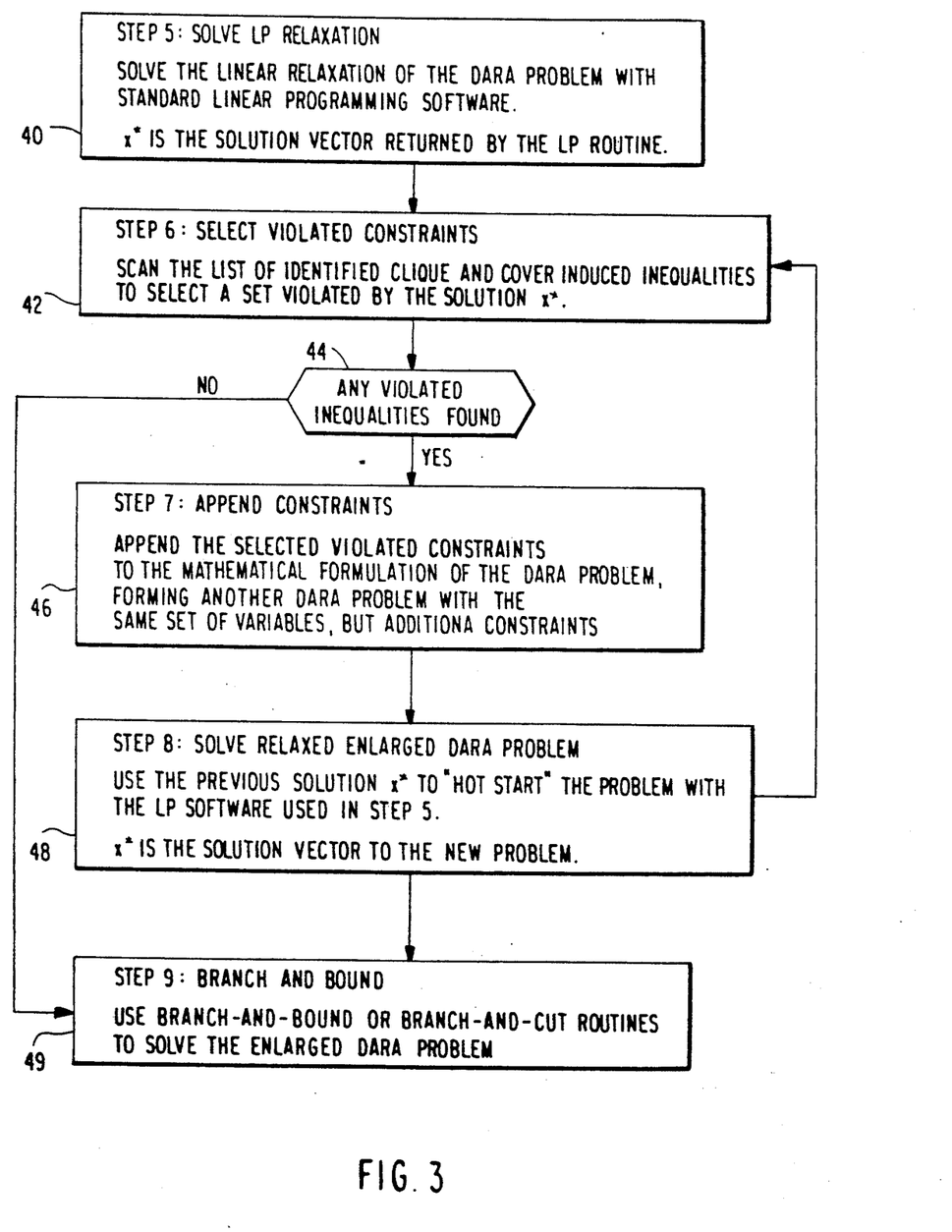

With reference now to FIGS. 2 and 3, there is shown a flowchart which illustrates the general procedure according to the present invention. The process begins in function block 30 with an initialization step. Specifically, data is read and the following data structures are initialized:

I = set of resources
J = set of activities
$a_{ij}$ = requirement of resource $i \epsilon I$ by activity $j \epsilon J$ ($a_{ij} \geq 0$)
$b_i$ = available quantity of resource $i \epsilon I$ ($b_i \geq 0$)
$c_j$ = benefit of completing activity $j \epsilon J$ Once initialization has been completed, the activities are reduced by discarding infeasible and non-profitable activities in function block 32. A non-profitable activity is defined as an activity $j \epsilon J$ where the benefit $c_j \leq 0$, and an infeasible activity is defined as an activity $j \epsilon J$ where there exists a resource $i \epsilon I$ with $a_{ij} > b_i$. Next, in function block 34, non-constraining resources are discarded. The criteria for discarding a resource $i \epsilon I$ is $\sum_{j \epsilon J} a_{ij} \leq b_i$ By reducing activities and resources, the discrete activity resource allocation (DARA) problem is simplified. The computer program can now mathematically model the DARA problem as simplified, and this is done in function block 36. Based on this mathematical formulation of the DARA problem, a list of cliques and covers (i.e., constraints) implied by the mathematical model is generated in function block 38. Typically, at this point in the process, the problem has been significantly reduced, and the user may not require further information from the decision support system. Only at the user's request does the model optimization control 23 submit the problem to the model solver 24 for a complete solution.

In function block 40 in FIG. 3, the linear relaxation of the DARA problem is solved using standard linear programming software, where x* is the solution vector returned by the linear programming routine, and using the solution x*, the list of identified clique and cover induced inequalities generated in function block 38 is scanned in function block 42 to select a set violated by the solution x*. A test is then made in decision block 44 to determine if any violated inequalities were found. If so, selected violated constraints are appended to the mathematical formulation of the DARA problem in function block 46 to form another DARA problem with the same set of variables, but with the additional constraints. This enlarged DARA problem is then solved in function block 48 using the previous x* solution to "hot start" the linear programming software. Most advanced linear programming software based on Simplex methods provide facilities for the "hot start". Basically, the previous solution x* is used as an (infeasible) starting point, and the "dual simplex method" is applied until the appended constraints become satisfied. The steps of function blocks 42, 44, 46, and 48 are repeated until no violated inequalities are found in decision block 44. At this point branch-and-bound or branch-and-cut routines are used in function block 49 to solve the enlarged DARA problem. "Branch-and-Bound" is a well documented procedure for solving combinatorial problems that have easy continuous relaxations. At each step, a variable, say $x_{j0}$, with a noninteger value in the continuous optimum x* is selected, and two subproblems are formed by setting $x_{j0}$ to each of its two possible values, respectively. In our application, each of these subproblems is again a DARA (with one fewer variable) and can be solved by applying the DARA solution procedure.

In addition to the specific application described, procedures for determining implied cardinality constraints are useful for solving a broad class of discrete optimization problems. Many discrete optimization problems have constraints in the form of equation (1.2), below:

$$\sum_{i \epsilon I} a_i \delta_i \leq b \qquad (1.2)$$

where $\delta_i$ is a 0–1 variable, $b > 0$, and each coefficient $a_i \geq 0$. In fact, any constraint on 0–1 variables can be put in this form by replacing $\delta_i$ by its binary complement $1 - \delta_i$ and appropriately modifying the right-hand side (hereafter rhs) whenever $a_i < 0$.

An inequality is said to be stronger than and equivalent to some other inequality if the LP obtained from replacing the first inequality by the second one has the same set of integer feasible solutions, and defines a smaller polytope that is contained in the polytope of the original problem IP. Some strong equivalent inequalities can be obtained by using coefficient reduction techniques, as described for example by G. H. Bradley, P. L. Hammer and L. Wolsey in "Coefficient reduction for inequalities in 0-1 variables", *Mathematical Programming* 7 (1974), pp. 263-282, and E. L. Johnson, M. M. Kostreva and U. H. Suhl, "Solving 0-1 integer programming problems arising from large-scale planning models", Operations Research 35 (1985), pp. 803-819.

In a recent series of papers (B. L. Dietrich and L. F. Escudero, "Coefficient reduction for knapsack constraints in 0-1 programs with variable upper bounds", *Operations Research Letters* 9(1990), pp. 9-14, and L. F. Escudero, "S3 sets. An extension of the Beale-Tomlin special ordered sets", *Mathematical Programming* 42 (1988), pp. 113-123), a methodology has been introduced for coefficient reduction in knapsack constraints by using additional information derived from special classes of constraints on the 0-1 variables. Facet-defining inequalities have been studied by E. Balas in "Facets of the knapsack polytope", *Mathematical Programming* 8 (1975), pp. 146–164, P. L. Hammer, E. L. Johnson and U. N. Peled in "Facets of regular 0–1 polytopes", *Mathematical Programming* 8 (1975), pp. 179–206, and L. A. Wolsey in "Facets for a linear inequality in 0–1 variables", *Mathematical Programming* 8 (1975), pp. 165–178.

Figure 4:
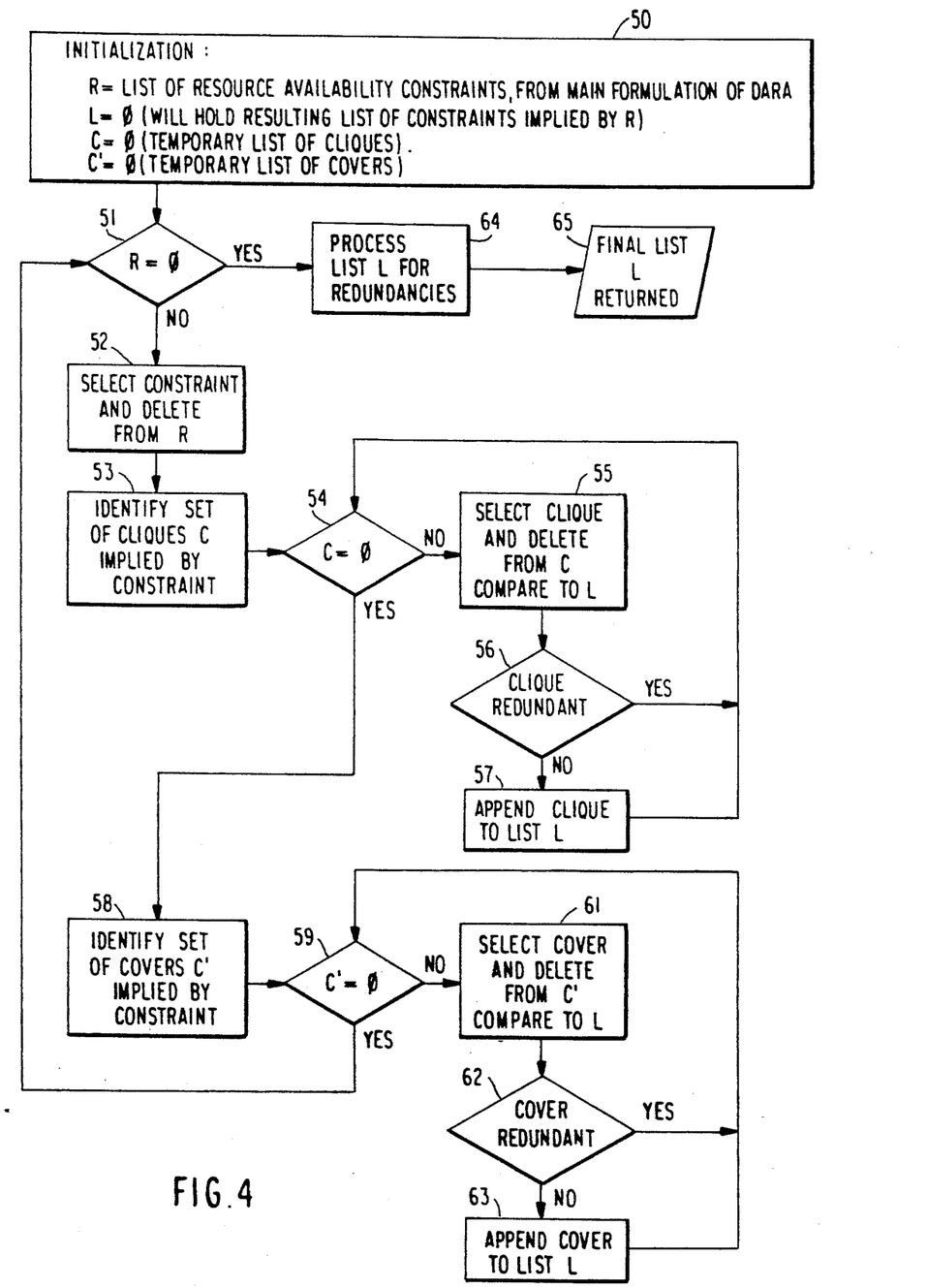
FIG. 4 is a flowchart showing in more detail the procedure of clique and cover generation as used on the procedure shown in the flowchart of FIGS. 2 and 3.

With reference now to FIG. 4, there is shown a flowchart of the process performed in function block 38 in FIG. 2. The process begins with an initialization step in function block 50. More specifically, the following data structure is established by the computer program:

R = list of resource availability constraints from the mathematical formulation of the DARA problem L:=0 (which will hold resulting list of constraints implied by R)

c:=0 (which is the temporary list of cliques)

c':=0 (which is the temporary list of covers)

A test is then made in decision block 51 to determine if the list R is empty. If not, a constraint is selected from the list in function block 52. The selected constraint is deleted from the list. Then, in function block 53, the set of cliques is identified by the selected constraint. A test is made in decision block 54 to determine if the list c is empty. If not, a clique is selected from the list in function block 55 and composed with the members of the list L. Based on this comparison, a determination is made in decision block 56 as to whether the clique is redundant. If not, the clique is appended to the list L in function block 57. In either case, the process loops back to decision block 54 until the list c is empty. At that point, the set of covers c' implied by the constraint selected in function block 52 are identified in function block 58. A test is then made in decision block 59 to determine if the list c' is empty. If not, a cover is selected from the list c' and compared with members of the list L in function block 61. Based on this comparison, a determination is made in decision block 62 as to whether the selected cover is redundant. If not, it is appended to the list L in function block 63. In either case, the process loops back to decision block 59 until the list c' is empty. At that point, the process loops back to decision block 51 and, if the list R is empty, the list L is processed for eliminating redundancies in function block 64. These are the constraints that are used in the decision support system. The user requests information and may choose to fix a variable at "0" or "1". When a variable is fixed, the model generator 20 and constraint generator 21 procedures repeat.

The following discussion describes computationally efficient procedures for identifying two strong types of valid inequalities, the so-called clique- and cover- induced inequalities for single 0–1 knapsack constraints. A clique is a subset J of the variables of which at most one can have a non-zero value in any feasible solution. That is, the constraint (1.3), below, is satisfied by any feasible 0–1 vector.

$$\sum_{i \in J} \delta_i \leq 1 \quad (1.3)$$

In addition to strengthening the LP relaxation, identifying cliques has proved to be very helpful in branch-and-bound methodologies as described by E. M. L. Beale and J. A. Tomlin in "Special facilities in a general mathematical programming system for nonconvex problems using ordered sets of variables", in: J. Lawrence (ed.), *Operations Research* 69, Tavistock Publishing, London (1970), pp. 447–454, L. F. Escudero in "S3 sets. An extension of the Beale-Tomlin special ordered sets", supra, and J. A. Tomlin in "Special ordered sets and an application to gas supply operation planning", *Mathematical Programming* 42 (1988), pp. 69–84. A cover is a subset J of variables at least $|J| - c_J$ of which must take the value zero in any feasible solution.

$$\sum_{i \in J} \delta_i \leq c_J \quad (1.4)$$

where $c_J < |J|$.

A minimal cover is a cover J such that if any variable $x_j$, $j \in J$ is deleted from the inequality (1.4), the resulting inequality is redundant (see below). Note that for a minimal cover, the induced constraint (1.4) must have $c_J = |J| - 1$. Several methods have been proposed (see H. Crowder, E. L. Johnson and M. Padberg, "Solving large-scale zero-one linear programming problems", *Operations Research* 31 (1983), pp. 803–834, and T. Van Roy and L. A. Wolsey, "Solving mixed integer programming problems using automatic reformulation", *Operations Research* 35 (1987), pp. 45–57) for identifying minimal cover induced inequalities that are most violated by the current LP solution. These constraints are then appended to the original problem.

Apart from detecting and appending violated clique and cover induced inequalities at each optimal LP iteration as in H. Crowder, E. L. Johnson and M. Padberg, "Solving large-scale zero-one linear programming problems", *Operations Research* 31 (1983), pp. 803–834, and T. Van Roy and L. A. Wolsey, "Solving mixed integer programming problems using automatic reformulation", supra, we have found it useful to identify all maximal cliques (see below) and a subset of minimal covers with reasonably small $c_J$, and append the induced inequalities permanently to the original problem. In addition to immediately strengthening the LP relaxation of the IP, and reducing the size of the corresponding branch-and-bound tree, these cliques and covers can be used in extended coefficient reduction methods (further strengthening the LP), and if a sufficient number of inequalities are identified, they can be used with a greedy heuristic to determine an initial feasible integer solution, or to detect problem infeasibility. Our techniques are specially useful in the new so-called branch-and-cut methodology for solving IPs; see, for example, K. Hoffman and M. Padberg, "LP-based combinatorial problem solving", *Annals of Operations Research* 4 (1985), pp. 145–194.

In the following discussion, procedures are presented for identifying all maximal cliques, and the extensions of a selected set of minimal covers together with related alternate sets implied by equation (1.2). That is, if a knapsack constraint in the IP (1.1) implies the clique and cover induced inequalities (1.3) and (1.4), respectively, then for each index $j \in J$, our procedures will identify a cover $J_j$ I and corresponding rhs $c_{Jj}$ in inequality (1.4) such that $j \in J_j$ and $|J_j| - c_{Jj} \geq |J| - c_J$. Note that inequality (1.3) is identical to inequality (1.4) for $c_J = 1$. The complexity of the procedures is $O(n \log n)$, where n is the number of activities in the set J.

IDENTIFICATION OF CLIQUES

There is first presented a procedure for identifying all maximal cliques implied by equation (1.2). A clique is said to be maximal if its induced inequality is not dominated by any other clique induced inequality. For example, $\delta_1+\delta_2\leq 1$ is dominated by $\delta_1+\delta_2+\delta_3\leq 1$). Formally, let $$\gamma(i) = \left\{ \begin{array}{l} \text{MIN } \{k | 1 \leq k \leq n, a_i + a_k > b \text{ for } i \neq k\} \\ n + 1, \text{ otherwise} \end{array} \right\} \quad (2.1)$$

If $\gamma(i)=n+1$, the variable $\delta_i$ is not included in any non-trival clique implied by equation (1.2). Otherwise, the set $\overline{C}(i)=\{i|(k|k\geq\gamma(i))\}$ is a maximal clique. For $\gamma(i)=n+1$, we define $\overline{C}(i)=\{i\}$, yielding the trival clique $\delta_i\leq 1$.

An algorithm is presented that identifies each maximal non-trival clique implied by equation (1.2) exactly once. Assuming that coefficients have already been sorted, the complexity of the algorithm is O(n). To understand the algorithm, note that for $i<j$ we have $\gamma(i)\geq\gamma(j)\neq n+1$ and, furthermore, $\gamma(i)=\gamma(j)$ if and only if $a_j+a_{\gamma(i)-1}\leq b$.

Clique Identification Procedure

STEP 1: $h:=\text{MIN } \{n, \text{MIN } \{k | 1<k\leq n-1, a_k+a_n>b \text{ for } h\neq k\}\}$ In this step, the smallest index that can be part of a clique is computed.

STEP 2: If $h=n$, STOP

If $h=n$, then there are no cliques, so the algorithm terminates.

STEP 3: $g:=\text{MIN } \{k | h<k\leq n, a_h+a_k>b\}$

In this step, $\gamma(h)=g$ is computed.

STEP 4: Report h,g the set $\{h\}k | g\leq k\leq n\}$ is the clique $\overline{C}(i)$.

STEP 5: If $g=h+1$, then STOP

If $g=h+1$, then for all $f>h$, $\overline{C}(f)\subset\overline{C}(i)$ for some $i\leq h$; i.e., all maximal cliques have been identified.

STEP 6: $h:=h+1$

STEP 7: If $g=h+1$ or $a_h+a_{g-1}\leq b$, then go to STEP 4.

STEP 8: $g:=g-1$

STEP 9: Go to STEP 7

In STEP 6, h was increased by one and, then, $\gamma(h-1)=g$. Then, in STEP 7, if $g=h+1$, $\gamma(h)=g$, and so a return is made to STEP 4. Otherwise, since we know that $\gamma(h-1)\geq\gamma(h)$, a check is made to see whether $\gamma(h)=g$. If so, a return is made to STEP 4 to report the clique; otherwise, we know that $\gamma(h)\leq g-1$, so g is decreased by 1 in STEP 8 and a return is made to STEP 7 in STEP 9 to check whether $\gamma(h)=g$.

The complexity of STEP 1 and STEP 3 is O(logn). The sequence from STEP 4 to STEP 9 clearly has complexity O(n). For illustrative purposes, Table 1 shows an example with n=8 and b=19. It identifies the cliques, say i=1,2,3.

TABLE 1

Cliques induced by $\sum_{i\in I} a_i\delta_i \leq b$ with $b = 19$

| i | 1 | 2 | 3 | 4 | 5 | 6 | 7 | 8 |
|---|---|---|---|---|---|---|---|---|
| a(i) | 3 | 6 | 9 | 13 | 15 | 16 | 17 | 18 |
| c = 1 | * | | | | | * | * | * |
| 2 | | * | | * | * | * | * | * |
| 3 | | | * | * | * | * | * | * |

Figure 5:
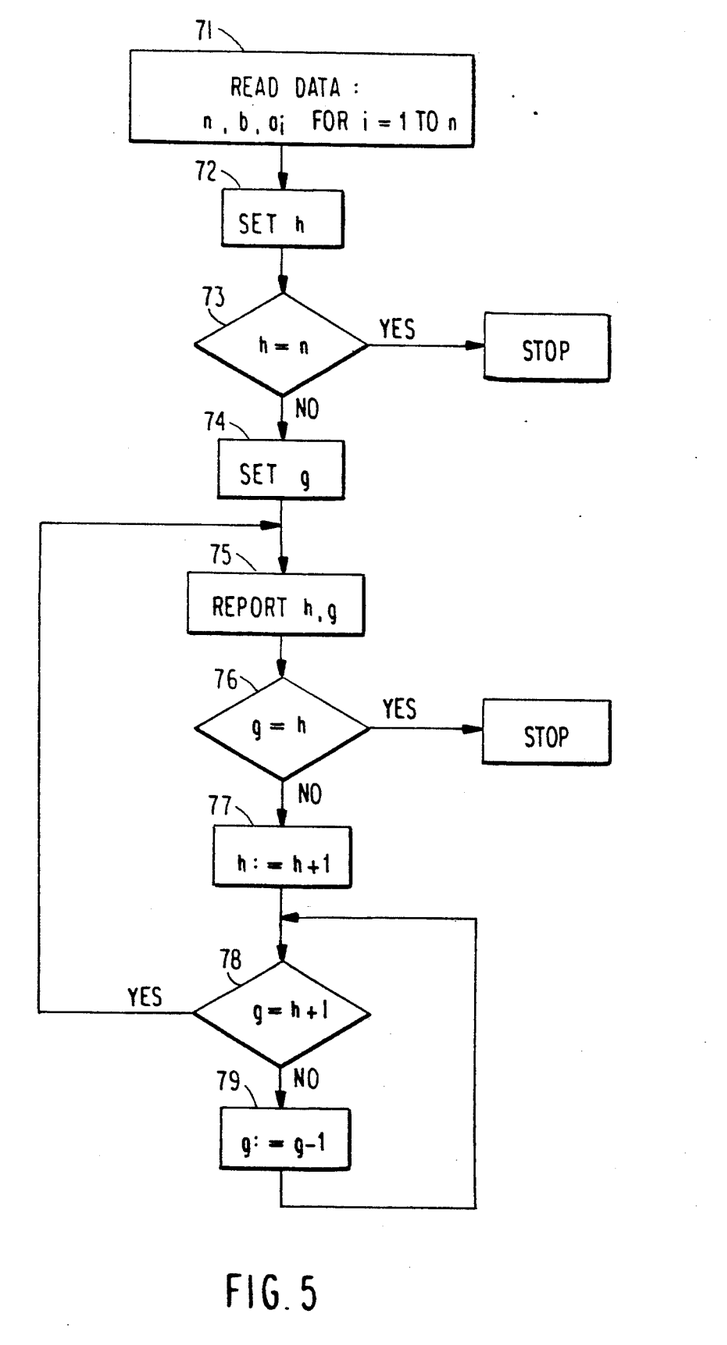
FIG. 5 is a flowchart of the cliques identification procedure used in the procedure shown in the flowchart of FIG. 4.

The flowchart for the cliques identification procedure performed in function block 53 of FIG. 4 is shown in FIG. 5, for a given constraint $$\sum_{i=1,n} a_i\delta_i \leq b.$$

The process begins in function block 71 by reading the data n, b and $a_i$ from i=1 to n. Then, the following steps are performed:

STEP 1: (function block 72)
$h:=\text{MIN } \{n, \text{MIN } \{k | 1<k\leq n-1, a_h+a_g>b \text{ for } h\neq k\}\}$ STEP 2: (decision block 73) If $h=n$, STOP.

STEP 3: If $h\neq n$, (function block 74)
$g:=\text{MIN } \{k | h<k\leq n, a_h+a_k>b\}$ STEP 4: (output block 75)
Report h,g.

STEP 5: (decision block 76)
If $g=h$, STOP.

STEP 6: If $g\neq h$, (function block 77)
$h:=h+1$.

STEP 7: (decision block 78)
If $g=h+1$ or $a_h+a_g\leq b$, go to STEP 4 (output block 75).

STEP 8: If $g\neq h+1$ and $a_h+a_g>b$, (function block 79)
$g:=g-1$, then go to STEP 7 (decision block 78)

ELEMENTAL CONCEPTS ON COVERS

Let S denote the set of feasible solutions, $$S = \left\{ \delta\epsilon\{0,1\}^n : \sum_{i\in I} a_i\delta_i \leq b \right\} \quad (3.1)$$

A set of variables, say C, is said to be a cover for equation (1.2) if the following condition is satisfied:

$$\sum_{i\in C} a_i > b \quad (3.2)$$

Then the following constraint holds:

$$\sum_{i\in C} \delta_i \leq k_c \quad (3.3)$$

for some choice of $k_c\leq |C|-1$ is a valid inequality for S and is called a cover induced inequality that is implied by equation (1.2). The cover C is minimal if all of its subsets with cardinality $|C|-1$ induce redundant inequalities; i.e., $$\sum_{i\in C} a_i > b \text{ and } \sum_{i\in C-\{j\}} a_i \leq b \quad j\in C \quad (3.4)$$

and then $k_c=|C|-1$ in the constraint (3.3). The extension, say E(C) of a minimal cover is the set $\alpha \{ k\epsilon I-C: a_k\geq a_i \; \forall \; i\epsilon C\}$. If C is a minimal cover, then $$\sum_{i\in E(C)} \delta_i \leq k_c \quad (3.5)$$

for $k_c=|C|-1$ is a valid inequality for S. See G. L. Nemhauser and L. A. Wolsey, "Integer and combinatorial optimization", cited above.

Let $\gamma(C)$ and $\bar{\gamma}(C)$ denote the smallest and biggest knapsack coefficients, respectively, for the variables from a given minimal cover, say C. That is, $$\gamma(C) = \text{argmin} \{a_j, i\epsilon C\} \quad (3.6)$$
and
$$\bar{\gamma}(C) = \text{argmax} \{a_i, i\epsilon C\}$$

The alternate set of index $\gamma(C)$ is the set of indices denote by A(C) that satisfy the following condition:

$$a_k \leq a_{\gamma(C)} \text{ and } \sum_{i\epsilon(C-\gamma(C))\cup j} a_i > b \; j\epsilon A(C) \quad (3.7)$$

$\gamma(C)\epsilon A(C)$, and if $a_k \leq a_i \leq a_j$, and both $a_k, a_j \epsilon A(C)$, then also $i\epsilon A(C)$. That is, A(C) is identified by the index of the smallest element, which is denoted by $\alpha(C)$.

The following inequality is valid for S:

$$\sum_{i\epsilon(E(C)-\gamma(C))\cup j} \delta_i \leq |C| - 1 \; j\epsilon A(C) \quad (3.8)$$

In the following, when no ambiguity will arise, (C) is dropped from $\alpha(C)$, $\gamma(C)$ and $\bar{\gamma}(C)$. A cover, say F′, is dominated by another cover, say F, if either of the conditions (3.9) to (3.10) is satisfied.

$$\bar{F} \subseteq F' \text{ and } k_{F'} - k_F > |F' - \bar{F}| \quad (3.9)$$

$$F' \subseteq F \text{ and } k_{F'} - k_F > 0 \quad (3.10)$$

DESCRIPTION OF IDENTIFIED COVERS

The maximal set of non-dominated covers that arises as extensions of minimal covers is generated with consecutive coefficients (henceforth C3). The extension, say E(C′) of a minimal C3, where C′={i,i+1, ..., i+K}, is dominated by another such cover, say E(C) if and only if C={i−1, i, ..., i−1+k} is also a minimal cover. Observe that |C| = |C′|. Note that a 0-1 feasible solution to the inequality induced by the cover E(C) is also feasible to the inequality induced by E(C′), but the opposite is not always true (it satisfies condition (3.10)). Note also that $\alpha(C) \leq \alpha(C')$. For any j such that $\alpha(C) \leq j \leq \gamma(C)$, the cover $(E(C')-\gamma(C'))\cup j$ is non-dominated. Let $\bar{\alpha}(C')$ denote the maximum such value of j; that is, $$\bar{\alpha}(C') = \begin{cases} \gamma(C') \text{ if } C' \text{ is non-dominated} \\ \text{MIN }\{\alpha(C) - 1 | C \text{ dominates } C'\} \end{cases} \quad (4.1)$$

Otherwise, for each minimal C3, say C′, we identify the non-dominated alternate set, say B(C′) of $\gamma(C')$. It can be expressed by $$B(C')=\{j|\alpha(C')\leq j\leq \bar{\alpha}(C')\} \quad (4.2)$$

Then, the set of non-dominated covers generated from a minimal C3, say C′, is given by $$E(C')-\gamma(C')\cup j, \; j\epsilon B(C') \quad (4.3)$$

IDENTIFICATION OF COVERS

Again, it is assumed that the coefficients are nondecreasing in the index i.

Procedure for identifying minimal C3's with extensions and alternates

Figure 6:
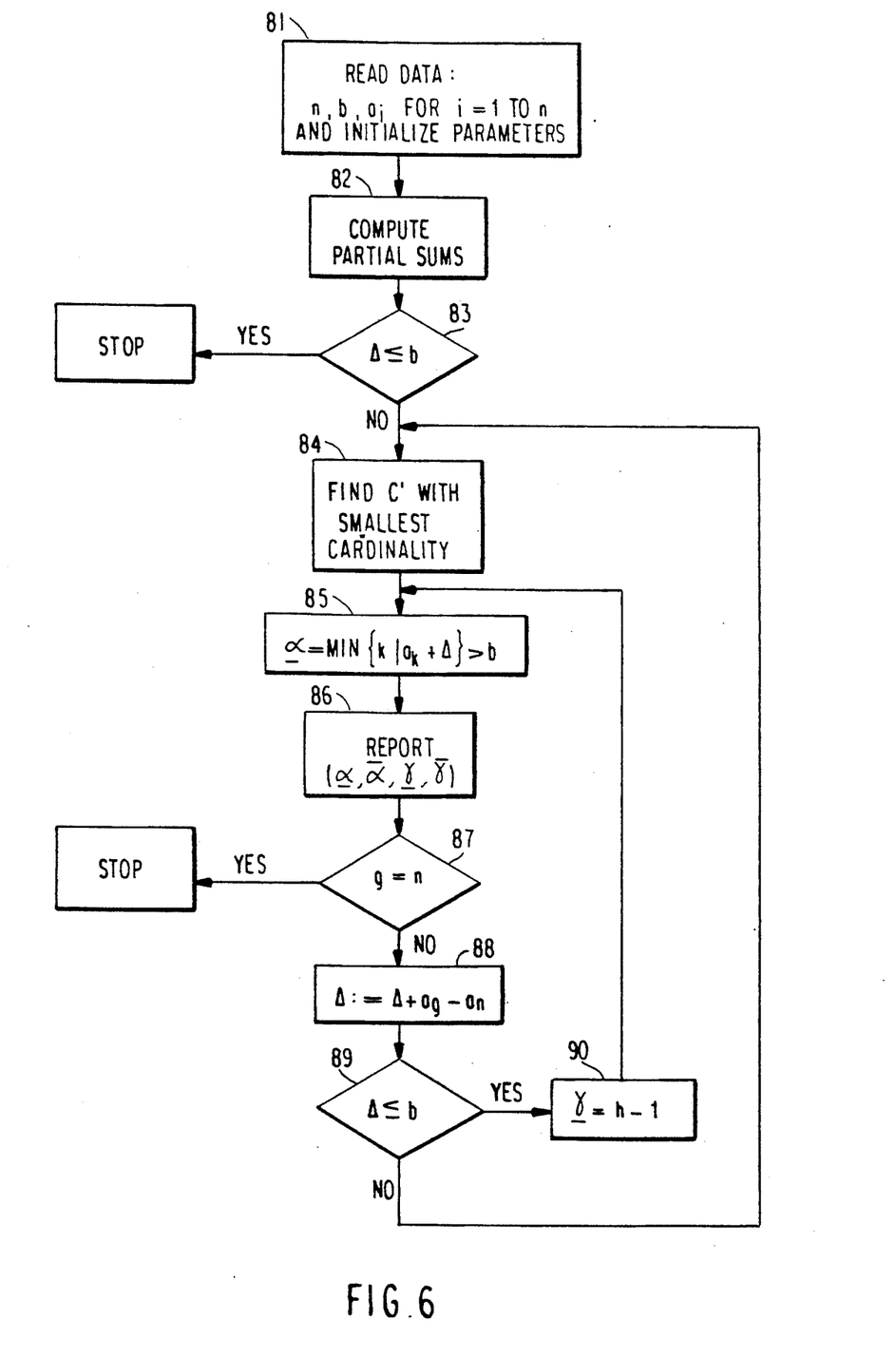
FIG. 6 is a flowchart of the covers identification procedure used in the procedure shown in the flowchart of FIG. 4.

The flow chart for the covers identification procedure performed in function block 58 of FIG. 4 is shown in FIG. 6, for a given constraint $$\sum_{i=1,n} a_i \delta_i \leq b.$$

The process begins in function block 81 as STEP 0.
STEP 0: g:=0, h:=1, $\Delta$:=0
This is the initializing step.
STEP 1: do until $\Delta > b$ or g=n g:=g+1 $\Delta$:=$\Delta + a_g$
if $\Delta \leq b$, STOP (decision block 83) otherwise: $\bar{\gamma}$:=g
In STEP 1 (function block 82), we begin by computing the partial sums $a_1, a_1+a_2, \ldots, a_1+a_2+\ldots+a_g$ until the rhs b is exceeded. The set
C′={1, 2, ..., $\bar{\gamma}$} is a cover with
$k_{c'}$:=$\gamma - 1$.
STEP 2: do until $\Delta \leq b$
$\Delta$:=$\Delta - a_h$
h:=h+1
$\gamma$:=h−1
$\bar{\alpha}$:=$\gamma$
In STEP 2 (function block 84), the subcover of C′, say C, with the smallest cardinality is determined, such that E(C) dominates E(C′); i.e., it satisfies condition (3.9). This subcover is C={$\gamma,\gamma+1, \ldots, \bar{\gamma}$} with $k_{c'}=\bar{\gamma}-\gamma$. Since E(C) is non-dominated, we set $\bar{\alpha}(C)=\gamma(C)$, and we proceed to STEP 3 to find $\alpha(C)$.
STEP 3: $\alpha$:=MIN $\{k|a_k+\Delta > b\}$ (function block 85)
STEP 4: If $\alpha \leq \bar{\alpha}$, then do report ($\alpha,\bar{\alpha},\gamma, \bar{\gamma}$)
$\bar{\alpha}$:=$\alpha - 1$
In STEP 4 (function block 86), if $\alpha \leq \bar{\alpha}$, then some non-dominated covers have been found, so the quadruple ($\alpha,\bar{\alpha},\gamma,\bar{\gamma}$) is reported. Note that $\alpha \leq \bar{\alpha} \leq \gamma \leq \bar{\gamma}$. The detected covers are as follows (note that all are non-dominated):

$$\{i\}\cup\{j|\gamma<j\leq\bar{\gamma}\}\forall i|\alpha\leq i\leq\bar{\alpha} \quad (5.1)$$

$\alpha$ is then decreased to $\alpha - 1$, so that if the extension of the next cover detected is dominated by the current cover E(C), we will be able to distinguish which of its alternates are non-dominated.
STEP 5: If g=n, STOP (decision block 87) If g$\neq$n, then g:=g+1 $\gamma$:=g $\Delta$:=$\Delta+a_g-a_h$ (function block 88)
h:=h+1
If $\Delta \leq b$, then do (decision block 89)
$\gamma$=h−1 (function block 90) go to STEP 3 go to STEP 2
In STEP 5, both end-points of the most recently found cover, C, are increased by one, to obtain a new cover, C′, with the same rhs. A check is made to see whether this is a minimal cover. If so, then E(C′) is dominated by the previous cover E(C) and, hence, a return is made to
STEP 3 to find $\alpha(C')$. Note that $k_{c'}=k_c$. If C′ is not a minimal cover, the left end-point should be increased until a minimal cover is found. The new cover is a subcover of C′. This is done by returning to STEP 2. At the end of each execution of each "do loop", $$\Delta = \sum_{k=h}^{g} a_k.$$

Because the indices h and g only increase, and are never decreased, each coefficient $a_k$ is added to the sum $\Delta$ and subtracted from the sum $\Delta$ at most once. Thus, the total complexity of STEPs 1, 2 and 5 is O(n). Determining minimal covers and extensions without the alternate sets requires O(n), once the coefficients are sorted. Since the coefficients are assumed sorted, each iteration of STEP 3 can be done as a binary search, requiring only O(logn) operations. If we choose to restrict the algorithm to producing covers with rhs less than or equal to some threshold c, then STEPs 3 and 4 are skipped, until $g - h + 1 \leq c$. In this case, only c binary searches are performed, so the complexity of the algorithm (not including the initial sort) is O(n). Then fewer weak covers will be identified.

EXAMPLES

Consider the example with $\phi = \infty$, $n = 21$ and $b = 119$ whose knapsack coefficients are given by Table 3. Obviously, there are no cliques. 20 covers are generated out of six minimal covers.

Table 2 shows the triplets that define the extensions of minimal covers and related alternate sets that have been generated by our procedure. Table 3 shows the whole set of generated covers.

TABLE 2

| Extensions of Minimal Covers and Alternate Extended Sets | | | |
|---|---|---|---|
| cover | c | α | γ |
| I | 10 | 1 | 3 |
| II | 9 | 1 | 5 |
| III | 8 | 2 | 7 |
| IV | 7 | 8 | 9 |
| V | 6 | 10 | 12 |
| VI | 5 | 15 | 15 |

TABLE 3

| | | | | | | | | | Covers for a Case with b = 119 and $\phi = \infty$ | | | | | | | | | | | | |
|---|---|---|---|---|---|---|---|---|---|---|---|---|---|---|---|---|---|---|---|---|---|
| | i | 1 | 2 | 3 | 4 | 5 | 6 | 7 | 8 | 9 | 10 | 11 | 12 | 13 | 14 | 15 | 16 | 17 | 18 | 19 | 20 | 21 |
| | $a_i$ | 5 | 6 | 6 | 7 | 9 | 10 | 10 | 11 | 12 | 14 | 14 | 15 | 15 | 16 | 17 | 18 | 20 | 21 | 22 | 22 | 23 |
| rhs | cov | | | | | | | | | | | | | | | | | | | | | |
| c | num | | | | | Covers: Value 1 means that the item is in related cover | | | | | | | | | | | | | | | |
| 10 | 1 | 1 | 0 | 0 | 1 | 1 | 1 | 1 | 1 | 1 | 1 | 1 | 1 | 1 | 1 | 1 | 1 | 1 | 1 | 1 | 1 | 1 |
| 10 | 2 | 0 | 1 | 0 | 1 | 1 | 1 | 1 | 1 | 1 | 1 | 1 | 1 | 1 | 1 | 1 | 1 | 1 | 1 | 1 | 1 | 1 |
| 10 | 3 | 0 | 0 | 1 | 1 | 1 | 1 | 1 | 1 | 1 | 1 | 1 | 1 | 1 | 1 | 1 | 1 | 1 | 1 | 1 | 1 | 1 |
| 9 | 4 | 1 | 0 | 0 | 0 | 0 | 1 | 1 | 1 | 1 | 1 | 1 | 1 | 1 | 1 | 1 | 1 | 1 | 1 | 1 | 1 | 1 |
| 9 | 5 | 0 | 1 | 0 | 0 | 0 | 1 | 1 | 1 | 1 | 1 | 1 | 1 | 1 | 1 | 1 | 1 | 1 | 1 | 1 | 1 | 1 |
| 9 | 6 | 0 | 0 | 1 | 0 | 0 | 1 | 1 | 1 | 1 | 1 | 1 | 1 | 1 | 1 | 1 | 1 | 1 | 1 | 1 | 1 | 1 |
| 9 | 7 | 0 | 0 | 0 | 1 | 0 | 1 | 1 | 1 | 1 | 1 | 1 | 1 | 1 | 1 | 1 | 1 | 1 | 1 | 1 | 1 | 1 |
| 9 | 8 | 0 | 0 | 0 | 0 | 1 | 1 | 1 | 1 | 1 | 1 | 1 | 1 | 1 | 1 | 1 | 1 | 1 | 1 | 1 | 1 | 1 |
| 8 | 9 | 0 | 1 | 0 | 0 | 0 | 0 | 0 | 1 | 1 | 1 | 1 | 1 | 1 | 1 | 1 | 1 | 1 | 1 | 1 | 1 | 1 |
| 8 | 10 | 0 | 0 | 1 | 0 | 0 | 0 | 0 | 1 | 1 | 1 | 1 | 1 | 1 | 1 | 1 | 1 | 1 | 1 | 1 | 1 | 1 |
| 8 | 11 | 0 | 0 | 0 | 1 | 0 | 0 | 0 | 1 | 1 | 1 | 1 | 1 | 1 | 1 | 1 | 1 | 1 | 1 | 1 | 1 | 1 |
| 8 | 12 | 0 | 0 | 0 | 0 | 1 | 0 | 0 | 1 | 1 | 1 | 1 | 1 | 1 | 1 | 1 | 1 | 1 | 1 | 1 | 1 | 1 |
| 8 | 13 | 0 | 0 | 0 | 0 | 0 | 1 | 0 | 1 | 1 | 1 | 1 | 1 | 1 | 1 | 1 | 1 | 1 | 1 | 1 | 1 | 1 |
| 8 | 14 | 0 | 0 | 0 | 0 | 0 | 0 | 1 | 1 | 1 | 1 | 1 | 1 | 1 | 1 | 1 | 1 | 1 | 1 | 1 | 1 | 1 |
| 7 | 15 | 0 | 0 | 0 | 0 | 0 | 0 | 0 | 1 | 0 | 1 | 1 | 1 | 1 | 1 | 1 | 1 | 1 | 1 | 1 | 1 | 1 |
| 7 | 16 | 0 | 0 | 0 | 0 | 0 | 0 | 0 | 0 | 1 | 1 | 1 | 1 | 1 | 1 | 1 | 1 | 1 | 1 | 1 | 1 | 1 |
| 6 | 17 | 0 | 0 | 0 | 0 | 0 | 0 | 0 | 0 | 0 | 1 | 0 | 0 | 1 | 1 | 1 | 1 | 1 | 1 | 1 | 1 | 1 |
| 6 | 18 | 0 | 0 | 0 | 0 | 0 | 0 | 0 | 0 | 0 | 0 | 1 | 0 | 1 | 1 | 1 | 1 | 1 | 1 | 1 | 1 | 1 |
| 6 | 19 | 0 | 0 | 0 | 0 | 0 | 0 | 0 | 0 | 0 | 0 | 0 | 1 | 1 | 1 | 1 | 1 | 1 | 1 | 1 | 1 | 1 |
| 5 | 20 | 0 | 0 | 0 | 0 | 0 | 0 | 0 | 0 | 0 | 0 | 0 | 0 | 0 | 0 | 1 | 1 | 1 | 1 | 1 | 1 | 1 |

Consider the example, with $\phi = \infty$, $n = 13$ and $b = 128$ whose knapsack coefficients are given by Table 4. There is only one clique, it is {12,13} and two extensions of minimal covers. The cardinality and rhs for the first one are 12 and 9, respectively, and for the second one they are 4 and 2, respectively. The cover are given in Table 4.

TABLE 4

| | | Covers for a Case with b = 128 and $\phi = \infty$ | | | | | | | | | | | |
|---|---|---|---|---|---|---|---|---|---|---|---|---|---|
| | i | 1 | 2 | 3 | 4 | 5 | 6 | 7 | 8 | 9 | 10 | 11 | 12 | 13 |
| | $a_i$ | 1 | 2 | 3 | 4 | 5 | 8 | 9 | 16 | 17 | 32 | 33 | 64 | 65 |
| rhs | cov | | | | | | | | | | | | | |
| c | num | Covers: Value 1 means that the item is in related cover | | | | | | | | | | | | |
| 9 | 1 | 0 | 1 | 1 | 1 | 1 | 1 | 1 | 1 | 1 | 1 | 1 | 1 | 1 |
| 2 | 2 | 0 | 0 | 0 | 0 | 0 | 0 | 0 | 0 | 0 | 1 | 1 | 1 | 1 |

Procedures have been presented for obtaining all maximal cliques and extensions of a selected set of minimal covers implied by a knapsack constraint in 0-1 programs. The induced constraints are independent in the sense that they are not dominated by any other. The complexity is O(nlogn) for all procedures. We are not aware of any other set of procedures with similar complexity. In addition to immediately strengthening the LP relaxation of IP models and reducing the size of branch-and-bound trees, these types of constraints can be used in extended coefficient reduction methods to further strengthening the LP.

An application of these procedures is the new branch-and-cut approach for solving IP problems; the automatic problem reformulation at selected nodes will very likely reduce the size of the tree (and, then, the computational effort to solve the IP problem). Stronger equivalent formulations can be obtained by using the information derived from the cliques and covers implied by the reduced knapsack constraints of the subproblem attached to given nodes.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer based system for discrete activity resource allocation in the manufacture of large, indivisible or highly customized products comprising:

order entry/tracking means for collecting orders and maintaining a list of all outstanding orders;

a bill of materials database and a machine/manpower requirements database;

bill of material explosion means responsive to said order entry/tracking means for accessing said bill of materials database and transforming said orders into raw material requirements;

machine requirements explosion means responsive to said order entry/tracking means for accessing said machine/manpower requirements database and determining machine and manpower requirements of each order;

inventory sensor means for determining available quantity of raw material;

shop floor sensor means for determining availability of machines and manpower;

profit analyzer means responsive to said order entry/tracking means, said bill of material explosion means and said machine requirements explosion means for determining a profit associated with each order;

data preprocessing means responsive to said inventory sensor means, said shop floor sensor means and said profit analyzer means for eliminating orders that cannot be produced and resources that will not affect order selection;

model generator means responsive to said data preprocessing means for mathematically modeling consumption of resources by orders and an availability of resources;

cardinality constraint generator means responsive to said model generator means for determining simple choices implied by a mathematical model generated by said model generator means; and interactive decision display means for displaying to a user choices generated by said cardinality constraint generator means to assist the user in deciding which orders to make and receiving from the user selection and rejection of orders, said interactive decision display means further providing inputs to said order entry/tracking means and said data preprocessing means based on said user selection and rejection of orders.

2. The computer based system for discrete activity resource allocation recited in claim 1 further comprising:

optimization model controller means for updating said mathematical model based on said user selection and rejection of orders; and optimization model solver means, including said cardinality constraint generator means, called by said optimization model controller means for generating an allocation of resources which is optimal among all allocations which said user selection and rejection of orders permits.

3. The computer based system for discrete activity resource allocation as recited in claim 2 further comprising floor control means responsive to said optimization model solver means for generating work orders and releasing inventory to a shop floor for orders selected by the user.

4. A computer performed process for discrete activity resource allocation in the manufacture of large, indivisible or highly customized products comprising:

collecting orders and maintaining a list of all outstanding orders using an order entry/tracking system;

accessing a bill of materials database and transforming orders into raw material requirements;

accessing a machine/manpower requirements database and determining machine and manpower requirements of each order;

determining available quantity of raw material using inventory sensors;

determining the availability of machines and manpower using shop floor sensors;

determining a profit associated with each order;

eliminating orders that cannot be produced and resources that will not affect order selection;

mathematically modeling consumption of resources by orders and an availability of resources;

determining simple choices implied by a mathematical model generated by a model generator; and interactively displaying to a user the choices implied by said mathematical model to assist the user in deciding which orders to make and receiving from the user selection and rejection of orders.

5. The computer performed process discrete activity resource allocation recited in claim 4 further comprising:

updating said mathematical model based on said user selection and rejection of orders; and generating an allocation of resources which is optimal among all allocations which said user selection and rejection of orders permits.

6. The computer performed process for discrete activity resource allocation as recited in claim 5 further comprising generating work orders and releasing inventory to a shop floor for orders selected by the user.

7. An interactive computer performed method for discrete activity resource allocation to generate and evaluate a production plan comprising the steps of:

inputting data related to inventory and machine availability;

reducing the number of all activities and resources which do not contribute to maximizing benefit by discarding all infeasible and non-profitable activities and discarding all non-constraining resources, thereby simplifying the solution to the problem of allocating activities and resources;

automatically formulating a mathematical model of a discrete activity resource allocation problem using activities and resources which remain after said reducing step;

generating a list of cardinality constraints from said mathematical model; and displaying to a user choices implied by said mathematical model to assist the user in deciding which orders to be filled and receiving inputs from said user selecting and rejecting orders to be filled by said production plan.

8. The interactive computer performed method for discrete activity resource allocation to generate and evaluate a production plan recited in claim 7 further comprising the steps of:

solving a linear relaxation of the discrete activity resource allocation problem by linear programming;

scanning a generated list of constraints to select a set violated by the solution of the linear relaxation of said discrete activity resource allocation problem;

for inequalities found, appending constraints to the formulated mathematical model of a discrete activity resource allocation problem to thereby form a new discrete activity resource allocation problem.

with the same set of variables but with additional constraints;

solving the new discrete activity resource allocation problem using a previous solution as a start of the solution of the new discrete activity resource allocation problem; and based on the solution of the new discrete activity resource allocation problem, scanning the generated list of constraints again and repeating the steps of appending constraints and solving the new discrete activity resource allocation problem until no violated inequalities are found.

9. The interactive computer performed method for discrete activity resource allocation to generate and evaluate a production plan recited in claim 8 further comprising the step of using conventional branch-and-bound or branch-and-cut routines, solving an enlarged discrete activity resource allocation problem to yield an optimal resource allocation producing maximum benefit.

10. The interactive computer performed method for discrete activity resource allocation to generate and evaluate a production plan recited in claim 9 further comprising the step of controlling execution of said plan by generating work orders and releasing inventory for orders selected by the user.

* * * * *